Feb. 21, 1928.
B. HEYMANN
1,659,819
STEERING DEVICE FOR VEHICLES
Filed Dec. 23, 1925  3 Sheets-Sheet 1
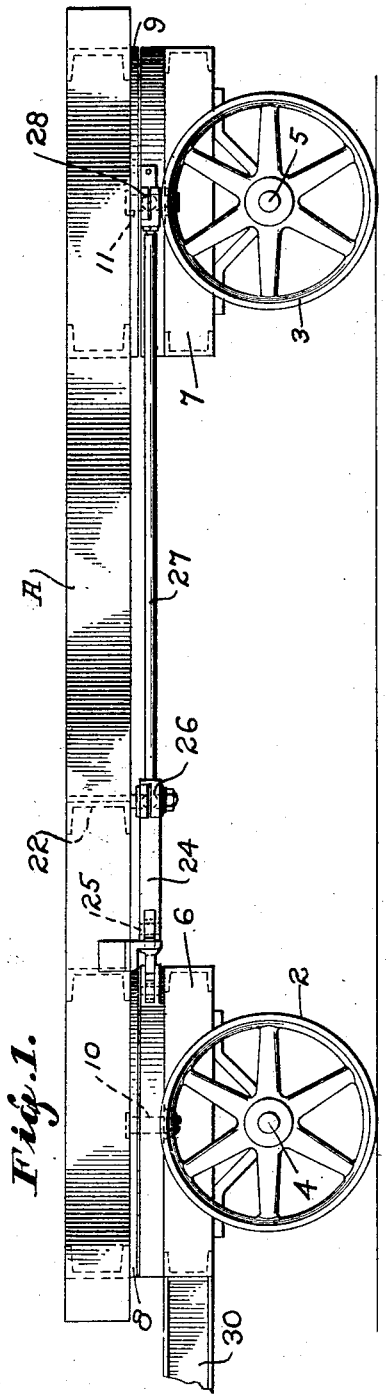
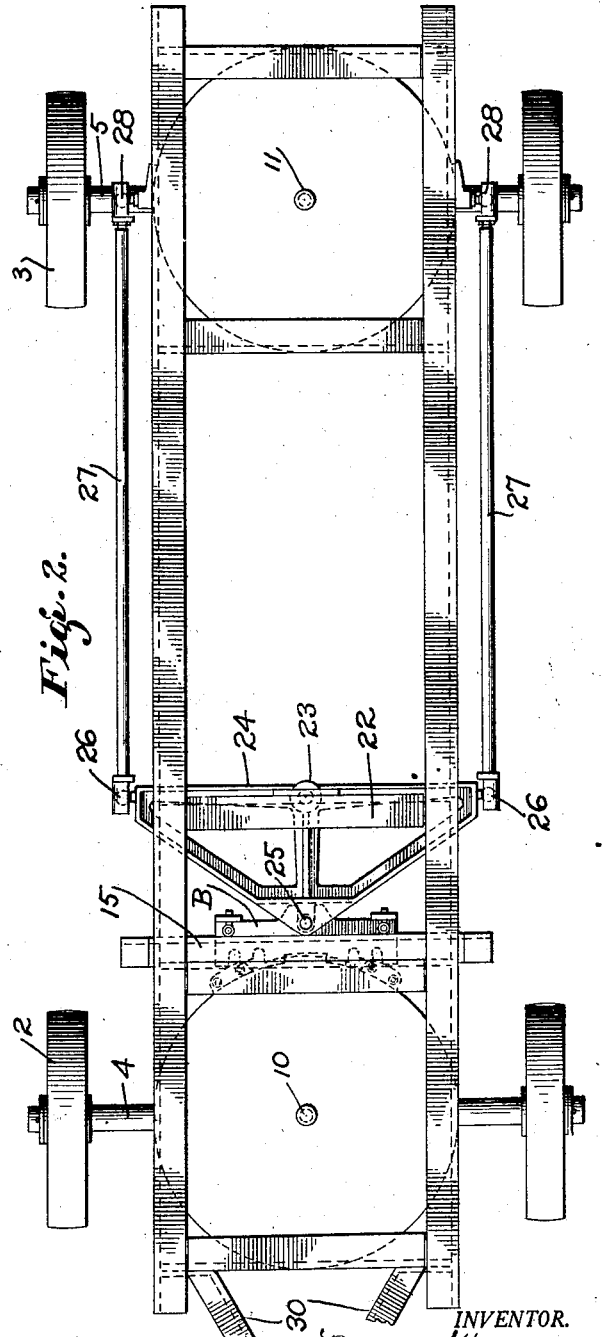
INVENTOR.
Bruno Heymann.
BY Dewey, Strong, Townsend & Loftus
ATTORNEYS.

Feb. 21, 1928. 1,659,819
B. HEYMANN
STEERING DEVICE FOR VEHICLES
Filed Dec. 23, 1925    3 Sheets-Sheet 2
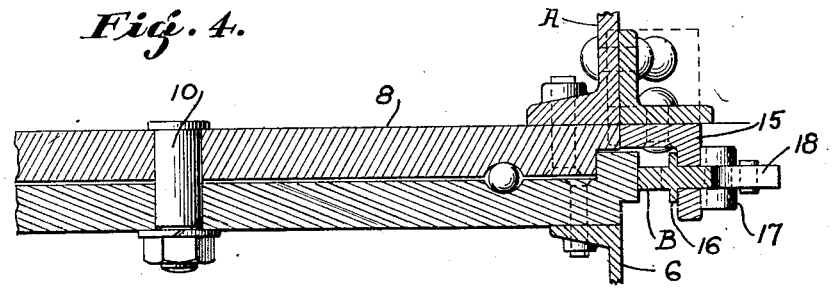
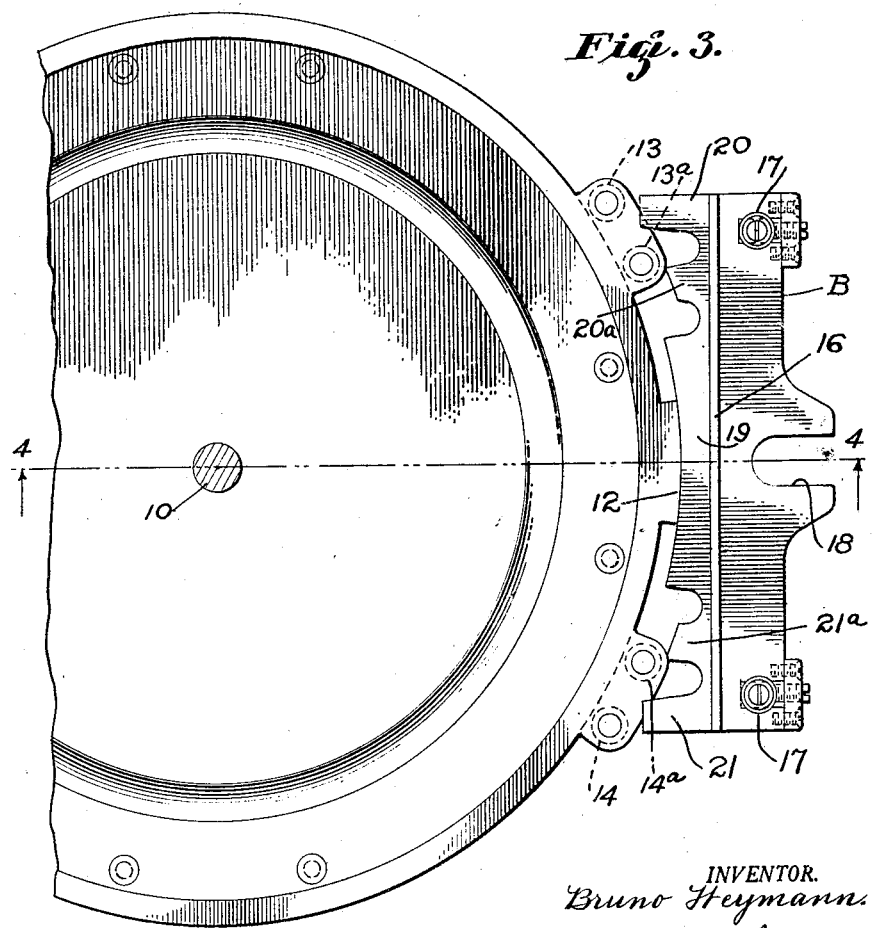

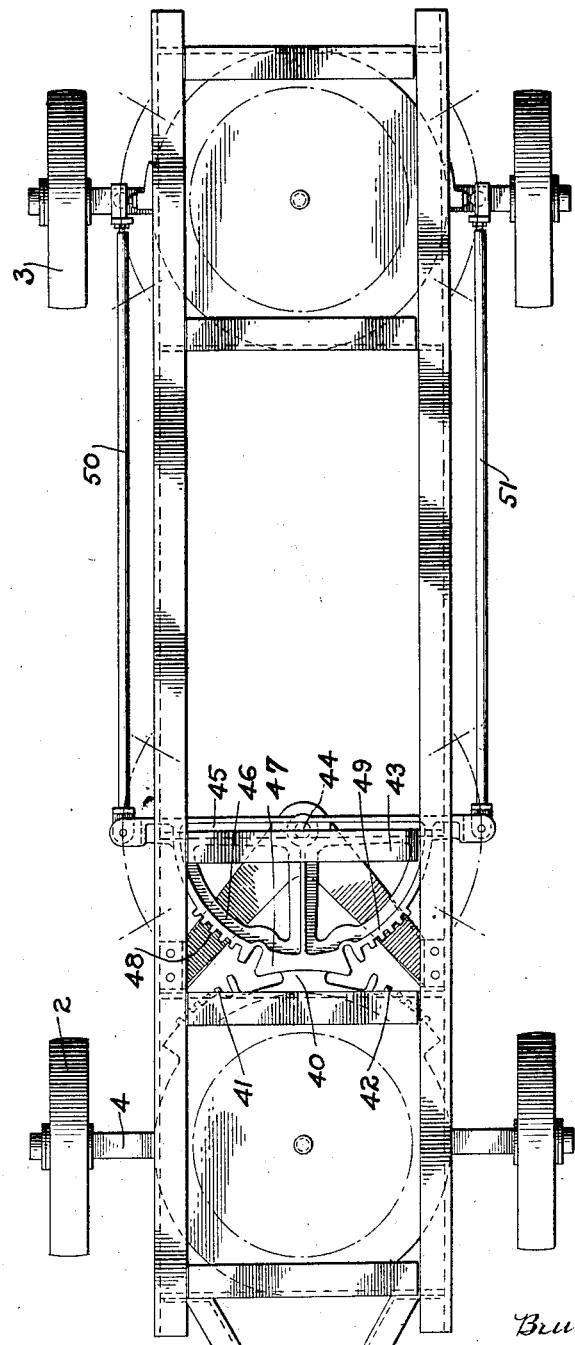

Patented Feb. 21, 1928.

1,659,819

UNITED STATES PATENT OFFICE.

BRUNO HEYMANN, OF SAN FRANCISCO, CALIFORNIA, ASSIGNOR TO F. W. WOLFE, OF MENLO PARK, CALIFORNIA.

STEERING DEVICE FOR VEHICLES.

Application filed December 23, 1925. Serial No. 77,235.

This invention relates to a steering device for vehicles and is in the present instance illustrated in conjunction with trailers of the tracking type, such as employed in road trains, etc.

A considerable number of trailers of the tracking type, such as employed in road trains, are in use today. A general inspection of the different makes of trailer and interviews with actual users and operators have proven that the average run of trailers is far from satisfactory.

The main objections encountered are: lost motion with consequent wobble and side whip; frequent breakage of the steering or actuating mechanism due to the strain imposed by side whip; and imperfect trailing when two or more trailers are connected as a train.

The object of the present invention is to generally improve and simplify the construction and operation of steering devices of the character described, and particularly to overcome the objections above referred to, this being accomplished by forming an intersteering connection between the front and rear wheels, which is provided with an intermittent motion or delay action device, whereby a predetermined free turning movement of the front wheels is permitted without transmitting any movement to the rear wheels, this free movement being sufficient to permit wobble or side whip of the front wheels without imposing any strain on the intersteering mechanism or in any way affecting tracking action or imparting any whip or wobble to the rear axle or rear wheels.

Two forms which the invention may assume are exemplified in the following description and illustrated in the accompanying drawings, in which:

Fig. 1 is a side elevation of a trailer showing the application of one form of the invention.

Fig. 2 is a plan view of the same.

Fig. 3 is an enlarged detail plan view of the delay action device.

Fig. 4 is a cross section on line 4—4 of Fig. 3.

Fig. 5 is a plan view of another form of steering mechanism as applied to a trailer.

Referring to the drawings in detail and particularly to Figs. 1 and 2, A indicates the main frame of a trailer or like vehicle, 2 the front or steering wheels, and 3 the rear wheels. The wheels are mounted on rigid axles as indicated at 4 and 5 respectively, and the axles are in turn supported by fifth wheels 6 and 7 which are turnably mounted with relation to stationary upper fifth wheel sections 8 and 9, the fifth wheels being connected by king pins or the like, as indicated at 10 and 11.

The foremost fifth wheel 6 is provided with a segment on its rear side, on which is formed a central lug 12 and two sets of rollers or pins 13 and 13$^a$ and 14 and 14$^a$. Disposed rearwardly of the segment carrying the lug 12 and the pins or rollers just referred to, is a cross bar 15. This bar is rigidly secured to the main frame and it is longitudinally slotted to receive a sliding bar generally indicated at B. This bar is provided with upper and lower vertical flanges 16 which engage the forward face of the cross bar 15, and the bar is also provided with adjustable rollers 17—17 which engage the rear side of the cross bar 15 to reduce friction to a minimum. The rear of the sliding bar is fork shaped, as at 18, while the forward face is provided with a segment 19 and two pairs of projecting lugs or teeth 20 and 20$^a$ and 21 and 21$^a$.

Secured to the main frame and extending cross-wise thereof at a point rearwardly of the cross bar 15 is a second cross bar 22. Pivotally mounted as at 23 on the cross bar is a beam 24. This beam is triangular in shape. Its apex or forward point carries a pin 25 which enters the fork 18 of the sliding bar while the ends of the beam are provided with ball and socket connections 26 which are connected with the rear fifth wheel 7 through means of rods 27 and ball and socket connections 28.

To describe the operation of the steering mechanism in general it will be supposed that the forward fifth wheel 6 is provided with a draw bar, a portion of which is indicated at 30 and that this draw bar is connected with a truck or tractor. If this is the case, it will be noted that any movement transmitted through the draw bar will cause the fifth wheel 6 to turn about is pivotal point 10, and as the front axle 4 is rigidly secured thereto the axle, together with the wheels 2, will also turn. If the turning movement is very slight, for instance, approximately 5 degrees or so, no movement will be transmitted to the rear fifth wheel and the axle 5 and wheels 3. This is due to the fact that the lug 12 on the front fifth wheel (see Fig. 3) turns freely with relation to the segment 19 on the sliding bar B. Thus, if any side whip or wobble is transmitted through the draw bar or otherwise, it can be seen that no movement will be transmitted to the rear wheels.

It will further be noted that the rear wheels are rigidly locked against any movement as the lug 12 and the segment 19 form an interlock similar to that on a Geneva movement. On the other hand, if movement is transmitted to the fifth wheel and axle, as when rounding a curve, lug 12 will swing out of engagement with the segment 19 and one or another of the pins 13ª or 14ª will engage the ends of the segment 19 and thereby impart a transverse movement to the sliding bar B. Any transverse movement imparted is transmitted through the fork 18 and pin 25 to the beam 24, and this swinging movement of the beam is in turn transmitted through the rods 27 to the rear fifth wheel and the axle and supporting wheels carried thereby, the movement transmitted being always reverse to the turning movement of the front wheels.

A connection of this character has several advantages. First of all, it permits wobble or side whip of the front wheels without imparting any movement to the rear wheels. This relieves the steering connections of any strain and it furthermore permits substantially perfect trailing at all times, as the side whip is not transmitted to the rear wheels. Secondly, if a train of trailers are lined up in parallelism with a loading platform or the like, it is possible for the train to pull away from the platform without striking the platform. This will be clearly understood when it is explained that the majority of trailers which have come to my attention are equipped with an inter-steering device, whereby the front and rear wheels always turn in unison, and in opposite directions. Trailers so equipped when placed parallel to a loading platform or curb are unable to turn away, as turning movement of the front wheels away from the platform is transmitted reversely to the rear wheels and the rear end of the trailer and the wheels thus have a tendency to swing inwardly towards the platform or curb. By providing the delay action device illustrated in the present application, it is possible for the front axle and the fifth wheel to assume an angle of 5 degrees or more without transmitting any movement to the rear axle and wheels, thus permitting a train of trailers to be pulled away from the platform without the rear ends of the trailers swinging inwardly or toward the platform.

It will further be noted that a trailer or other vehicle equipped with the steering mechanism here illustrated is capable of employing a long wheel base, as the steering difficulties heretofore encountered in long base vehicles have been entirely overcome.

Fig. 5 shows another form of steering mechanism. In this instance the front wheels 2 are carried by a rigid axle 4 as in the structure shown in Figs. 1 and 2 and the axle is in turn carried by a fifth wheel. Attached to the rear side of the movable section of the fifth wheel is a lug 40 and a plurality of gear teeth 41 and 42, the gear teeth being arranged in a manner similar to a mutilated spur gear. Extending across the frame is a transverse bar 43 and pivotally mounted thereon as at 44 is a transversely disposed steering arm 45. Secured to the forward side of the arm or formed integrally therewith is a segment 46. This is provided with a centrally disposed elongated lug 47 and with gear teeth 48 and 49, the gear teeth 48 cooperating with the teeth 49 on the fifth wheel and the gear teeth 49 with the gear teeth 42.

The rear steering wheels 3 are also carried by a rigid axle and this is in turn secured to a fifth wheel in a manner similar to that described in connection with Figs. 1 and 2. The rear fifth wheel together with the axle and supporting wheels 3 is swung by the steering arm 45 through intermediate connecting links 50 and 51. The operation of this structure is substantially the same as the structure shown in Figs. 1 and 2, the only difference being that the transverse sliding bar B is eliminated. Lug 40 moves freely with relation to the lug 47 when a slight turning movement is transmitted to the front fifth wheel, but when this predetermined movement is exceeded and lug 40 swung out of engagement with 47 one set of gear teeth or another will engage each other and movement will thus be transmitted from the front fifth wheel to the steering arm to swing it about the pivot 44. Such swinging movement is in turn transmitted through the rods 50 and 51 to the rear fifth wheel and the rear wheels 3 are accordingly turned about the axis of the fifth wheel and in a direction reverse to the movement of the front fifth wheel and the supporting wheels 2.

From the foregoing it is noted that several forms of steering mechanism may be employed, the main object being that of transmitting steering movement from the front wheels to the rear wheels after the front wheels have moved a predetermined distance.

Having thus described my invention what I claim and desire to secure by Letters Patent is—

1. In a vehicle, a main frame, a pair of front and a pair of rear steering wheels, means for transmitting turning movement of the front wheels to the rear wheels in a reverse direction, said means permitting an initial free turning movement of the front wheels without transmitting movement to the rear wheels, and rigid means for positively locking the rear wheels against turning movement during the initial free turning movement of the front wheels.

2. In a vehicle, a main frame, a front and rear fifth wheel pivotally mounted thereon, an axle and a pair of wheels cooperating with each fifth wheel, means for transmitting turning movement of the front fifth wheel to the rear fifth wheel, said means permitting an initial free movement of the front fifth wheel without transmitting movement to the rear fifth wheel, and rigid means positively locking the rear fifth wheel against turning movement during said initial movement of the front fifth wheel.

3. In a vehicle, a main frame, a front and a rear fifth wheel pivotally mounted thereon, an axle and a pair of wheels cooperating with each fifth wheel, a transversely slidable member mounted on the frame, a beam pivotally mounted on the frame, means for transmitting movement of the sliding member to swing the beam about its pivot, means for transmitting swinging movement of the beam to turn the rear fifth wheel, and means for transmitting movement from the front fifth wheel to move the sliding member.

4. In a vehicle, a main frame, a front and a rear fifth wheel pivotally mounted thereon, an axle and a pair of wheels cooperating with each fifth wheel, a transversely slidable member mounted on the frame, a beam pivotally mounted on the frame, means for transmitting movement of the sliding member to swing the beam about its pivot, means for transmitting swinging movement of the beam to turn the rear fifth wheel, and means for transmitting movement from the front fifth wheel to move the sliding member, and means permitting a predetermined free turning movement of the front fifth wheel before transmitting any movement to the sliding member.

5. In a vehicle of the character described, a pair of front and a pair of rear steering wheels, an intermediate steering member from which movement is transmitted to steer the rear wheels, means whereby steering movement of the front wheels is transmitted to operate the intermediate steering member only after an initial free movement of the front wheels, and rigid means positively locking the intermediate steering member and the rear wheels against movement during the initial movement of the front wheels.

6. In a vehicle of the character described, a pair of front and a pair of rear steering wheels, a centrally pivoted steering arm disposed between the front and the rear wheels, means whereby steering movement of the front wheels is transmitted to swing the steering arm about its pivot, said means permitting an initial free steering movement of the front wheels before transmitting movement to the steering arm, rigid means positively locking the steering arm against movement during the initial movement of the front wheels, and means whereby movement of the steering arm is transmitted to steer the rear wheels and to turn them in a direction reverse to the front wheels.

7. In a vehicle, a main frame, a pair of front and a pair of rear steering wheels, means for transmitting turning movement of the front wheels to the rear wheels in a reverse direction, said means permitting an initial free turning movement of the front wheels without transmitting movement to the rear wheels, and rigid coacting interlocking means for positively locking the rear wheels against turning movement during the initial free turning movement of the front wheels, said interlocking means being carried out of such interlocked relation by the movement of the front wheels beyond such free initial movement.

BRUNO HEYMANN.